March 12, 1940.    P. H. STANLEY    2,193,498
AIRCRAFT HAVING ROTATIVE SUSTAINING WINGS
Filed Jan. 14, 1938
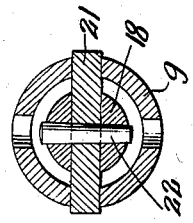
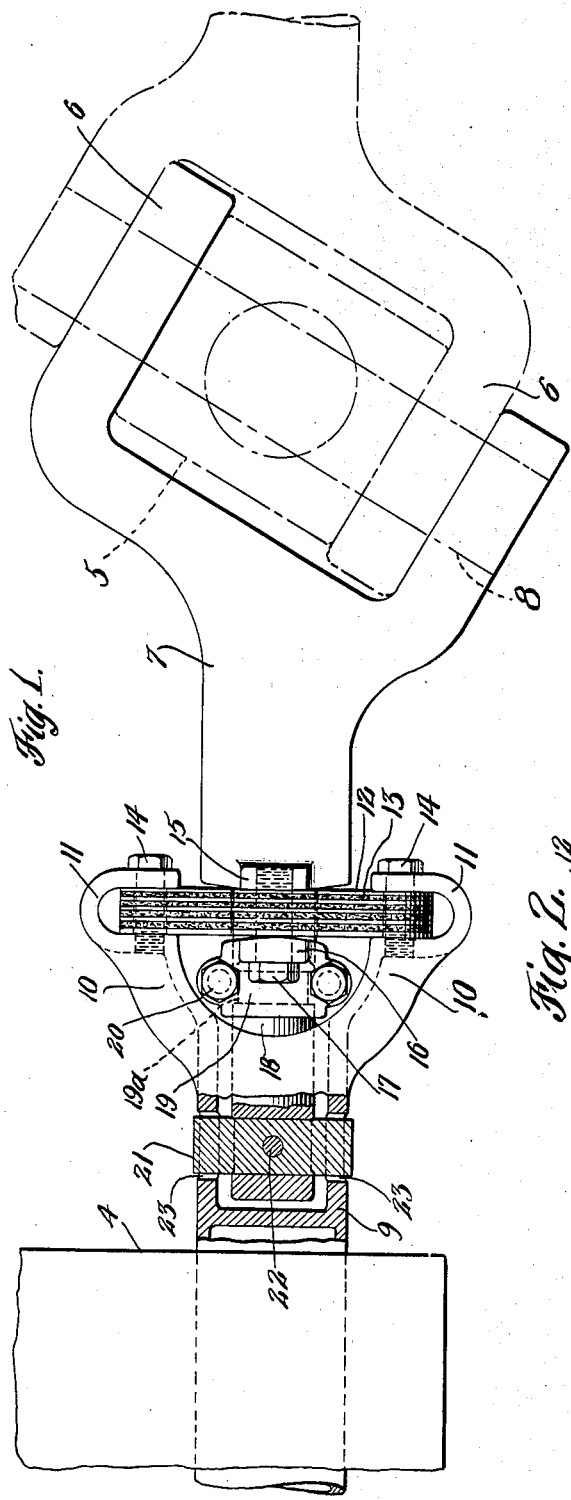
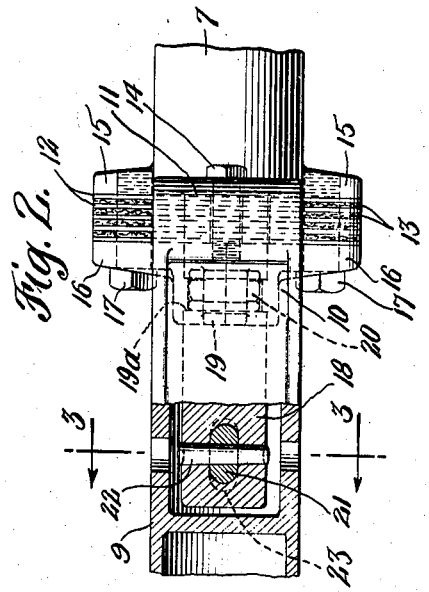
INVENTOR.
Paul H. Stanley
BY
Symmestredt & Lechner
ATTORNEYS.

Patented Mar. 12, 1940

2,193,498

UNITED STATES PATENT OFFICE 2,193,498

AIRCRAFT HAVING ROTATIVE SUSTAINING WINGS

Paul H. Stanley, Huntingdon Valley, Pa., assignor, by mesne assignments, to Autogiro Company of America, a corporation of Delaware Application January 14, 1938, Serial No. 184,914

7 Claims. (Cl. 244—18)

This invention relates to aircraft sustaining rotors and is particularly concerned with a blade mounting for such rotors, being especially useful in autorotatable rotors (examples of which are disclosed in Patent 1,985,819 issued December 25, 1934, to Juan de la Cierva).

In rotors of this general type it has been common to provide for each blade at least two hinges interconnecting the blade with the hub and respectively providing freedom for some degree of blade swinging movement generally transverse the rotative path of travel and generally within the rotative path of travel. The latter movement is frequently provided by a "drag" pivot the axis of which is at an angle to a plane perpendicular to the axis of the hub and is offset from the axis of the hub. In flight, aerodynamic forces cause the blade to lag and lead on the drag hinge at different points in the circle of rotation, and it has been usual to employ some adjustable damping device in association with the drag hinge for limiting, restricting, or resisting movement of the blade about the axis of the drag hinge.

With such prior constructions, even when the drag hinge was offset from the center of rotation to the proper degree for smooth operation in normal flight but was not such as to suit all operating conditions, resonant and/or excessive oscillations of the blades were apt to occur, particularly when starting up the rotor while on the ground, and it was therefore customary to adjust the blade dampers rather tightly, which resulted in an undesirably high degree of resistance to normal lag and lead movements of the blade during flight. Additionally, the problem of maintaining uniformity of adjustment of the several blade dampers was a troublesome one. Further, the drag hinge of course had to be lubricated.

The present invention contemplates the obviation of one or more or all of the above-mentioned difficulties, preferably by the elimination of the so-called drag pivot or hinge and the substitution of an entirely different type of joint.

More particularly, the invention provides a joint comprising one or more elements formed of flexible material, this flexible connection providing freedom for some lag and lead movements of the blade and, at the same time, eliminating the necessity for employment of a supplementary device for resisting, restricting and/or damping the lag and lead movements.

In addition to the foregoing the improved joint of the present invention provides for absorption of vibrations and the like, and thus avoids transmission of such vibrations from the blade to the hub and from there to the body of the machine or through the control system (where the rotor is tiltably mounted for control) to the pilot's control member.

In addition to all of the foregoing, the structure incorporated in the improved blade mounting of this invention is materially simplified as compared with many heretofore employed.

While the improved flexible joint mechanism of the present invention is herein described and illustrated as utilized in place of the drag hinge, as it is of especial advantage in serving that function, it should be understood that it may be employed in place of one or more other hinges.

How the foregoing, together with other objects and advantages are attained will be more apparent from a consideration of the following description referring to the accompanying drawing, in which —

Figure 1 is a fragmentary plan view (with parts in horizontal section) of the root end of a blade and its mounting on a hub;

Figure 2 is a side view of the improved joint of this invention, with certain parts shown in vertical section; and Figure 3 is a transverse sectional view taken through the blade root as indicated by the section line 3—3 on Figure 2.

A fragment of the inner end of a blade appears at 4 in Figure 1 and the hub on which the blade is mounted is diagrammatically indicated at 5. The hub 5 is embraced by the prongs 6—6 of a fork or mounting member 7, the prongs 6 being apertured to receive the pivot 8 which serves to connect the member 7 with the hub in a manner to provide freedom for movement of the blade in a direction transverse to a plane perpendicular to the axis of the hub.

The blade root fitting 9 is branched at its inner end as at 10—10, the two branches lying diametrically opposite to each other and being provided with U-shaped yokes 11 for the reception of the flexible elements of the joint. The joint preferably consists of a multiplicity of discs or plates of flexible material. Desirably, alternate discs 12 and 13 are made respectively of steel and non-metallic material such, for instance, as fibrous type brake lining material. The stack of discs are received in the U-shaped yokes 11—11 of the blade root fitting and are secured therein as by studs 14.

The discs of the flexible joint are connected with the blade mounting member 7 by means of lugs 15 positioned at the inner side of the discs and complementary lugs 16 positioned opposite thereto at the outer side of the discs, the two sets of lugs being secured together as by studs 17.

Centrally, the discs 12 and 13 are apertured to pass an extension 18 projecting radially outwardly from the member 7, on which extension the lugs or elements 16 are carried as by means of complementary brackets 19. The brackets 19 are clamped together by bolts 20 and are provided with internal semi-circular shoulders adapted to engage the peripheral groove 19a on the extension 18.

In connection with the joint it should be noted that the yokes 11—11 and the two pairs of lugs 15—16 are offset from each other circumferentially around the longitudinal axis of the blade substantially 90°, the yokes 11 being located generally in the plane of the blade.

As clearly seen in Figure 1, the opposing faces of the lugs 15—16 and the adjacent end portions of the brackets 19 and the member 7 are curved to permit flexing of the discs 12 and 13 in the plane of this view.

The extension 18 of the member 17 enters the hollow root end fitting 9 and toward its outer end the extension 18 is horizontally apertured to receive the stop and guide device 21. This device is rigidly secured to the extension 18, for example, by pin 22. The outer ends of the stop device 21 project into slotlike apertures 23 formed in the side walls of the blade root member 9. The device 21 engages the upper and lower side walls of the slots 23 and by this means the blade is restrained against movement in a direction transverse its path of travel. The length of slots 23, however, is such as to permit freedom for the blade to swing generally in the path of rotation about a generally upright axis through the flexible joint.

The stop device 21—23 also operates to relieve the discs 12 and 13 of torsional strains about the axis of the blade. Still further, the elements just mentioned perform a safety function since, in the event of failure of the discs 12 and 13, the stop device 21 will engage the inner ends of slots 23 and thus prevent loss of the blade. Under such conditions the stop 21 serves as the sole means of preventing undesired pitch change of the blade upon failure of the discs.

The present invention thus provides an extremely simple joint affording freedom for lag and lead movements of the blade and, because of the nature of the joint, especially when employing alternate discs of steel and some brake lining material, it is not necessary to use a supplementary device for restricting blade movement in this sense. The alternate layers of different materials, as described, create an interlaminar friction tending to stabilize the blade. This affords a damping action for blade movement and the flexible connection is at the same time self-centering in action.

Since the improved joint of this invention incorporates elements of flexible material, the arrangement serves to absorb vibrations which would otherwise be transmitted to the hub. The fact that the flexible elements constitute the sole connection through which the thrust of centrifugal force is transmitted from the blade to the hub also aids in damping or absorbing vibrations.

I claim:

1. In an aircraft sustaining rotor having a hub and a blade, mechanism for mounting the blade on the hub including an element made of flexible material constituting the sole connection through which the thrust of centrifugal force on the blade is transmitted to the hub, said element defining an axis for blade movement providing freedom for swinging of the blade generally in the plane of rotation, and means restraining the blade from flexing said element in a plane generally transverse the plane of rotation.

2. In an aircraft sustaining rotor having a hub and a blade, mechanism for mounting the blade on the hub including an element made of flexible material providing freedom for swinging movement of the blade generally in the plane of rotation, means relieving said element of torsional loads generally about the axis of the blade, and a hinge mounting for the blade on the hub providing freedom for swinging movement of the blade generally transverse the plane of rotation.

3. In an aircraft sustaining rotor having a hub and a blade, a flexible connection for mounting the blade on the hub including an element made of flexible material and constituting said connection, said element providing freedom for swinging movement of the blade generally in the plane of rotation and being self-centering as to said swinging movement, means restraining the blade from flexing said element in a plane generally transverse the plane of rotation, and a hinge mounting for the blade on the hub providing freedom for swinging movement of the blade generally transverse the plane of rotation.

4. In an aircraft sustaining rotor having a hub and a blade, a hinge for mounting the blade on the hub with freedom for blade swinging movement in a direction generally transverse a plane perpendicular to the axis of the hub, a flexible joint interconnecting the blade and its hinge mounting and providing freedom for blade movement with respect to the hinge mounting generally within the plane perpendicular to the axis of the hub, said flexible connection comprising an element made of flexible material and constituting the sole connection through which the thrust of centrifugal force on the blade is transmitted to the hinge mounting, and means for relieving said element of torsional load about the axis of the blade and for restraining the blade, in normal flight operation, from flexing said connection in a direction lying in a plane transverse to the plane which is perpendicular to the hub axis.

5. In an aircraft sustaining rotor having a hub and a blade, a hinge for mounting the blade on the hub with freedom for blade swinging movement in a direction generally transverse a plane perpendicular to the axis of the hub, a flexible joint interconnecting the blade and its hinge mounting and providing freedom for blade movement with respect to the hinge mounting generally within the plane perpendicular to the axis of the hub, said flexible connection comprising an element made of flexible material and constituting the sole connection through which the thrust of centrifugal force on the blade is transmitted to the hinge mounting, and means for relieving said connection of torsional moments acting in a sense to change the blade pitch.

6. In an aircraft sustaining rotor blade mounting, a member for connecting the blade with its hub, a blade root member, a laminated flexible disc connection between said members lying in a plane generally transverse the longitudinal axis of the blade and constituting the sole connection through which the thrust of centrifugal force in flight is transmitted from the blade root member to the mounting member, and means connected with said two members for restraining relative movement thereof in a direction transverse to a plane perpendicular to the axis of rotation.

7. In an aircraft sustaining rotor having a hub and a blade, mechanism for mounting the blade on the hub including a pair of members one of which is connected with the hub and the other of which is connected with the blade, a flexible disc type joint interconnecting said members and lying in a plane generally transverse the longitudinal axis of the blade and normally serving to transmit the centrifugal load on the blade to the hub, and a safety device including cooperating stops associated with said members at opposite sides of the flexible joint and adapted to abut and transmit the thrust of centrifugal force from the blade to the hub in the event of failure of said flexible joint.

PAUL H. STANLEY.